(12) United States Patent
Ishizuka

(10) Patent No.: US 9,046,154 B2
(45) Date of Patent: Jun. 2, 2015

(54) WHEEL DRIVE UNIT

(71) Applicant: Sumitomo Heavy Industries, Ltd., Tokyo (JP)

(72) Inventor: Masayuki Ishizuka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/080,450

(22) Filed: Nov. 14, 2013

(65) Prior Publication Data

US 2014/0141931 A1    May 22, 2014

(30) Foreign Application Priority Data

Nov. 21, 2012    (JP) .................... 2012-255524

(51) Int. Cl.
| | |
|---|---|
| *F16H 1/28* | (2006.01) |
| *B60K 17/04* | (2006.01) |
| *B60K 7/00* | (2006.01) |
| *F16H 57/08* | (2006.01) |

(52) U.S. Cl.
CPC ............. *F16H 1/28* (2013.01); *B60K 7/0007* (2013.01); *F16H 57/082* (2013.01); *B60K 17/046* (2013.01)

(58) Field of Classification Search
None
See application file for complete search history.

(56) References Cited

U.S. PATENT DOCUMENTS

| | | | | | |
|---|---|---|---|---|---|
| 3,770,075 | A | * | 11/1973 | Vegners | 180/308 |
| 4,649,772 | A | * | 3/1987 | Daniel et al. | 475/331 |
| 2005/0105840 | A1 | * | 5/2005 | Muranaka et al. | 384/544 |
| 2009/0000840 | A1 | * | 1/2009 | Murata | 180/65.5 |
| 2009/0312134 | A1 | * | 12/2009 | Schoon | 475/154 |
| 2011/0130238 | A1 | * | 6/2011 | Schoon | 475/154 |

FOREIGN PATENT DOCUMENTS

| | | |
|---|---|---|
| DE | 19911458 A1 | 10/1999 |
| WO | 00/36317 A1 | 6/2000 |

OTHER PUBLICATIONS

Extended European Search Report issued in counterpart European Patent Application No. 13004890.3 dated Feb. 17, 2014 (5 pages).

* cited by examiner

*Primary Examiner* — Justin Holmes
*Assistant Examiner* — David Morris
(74) *Attorney, Agent, or Firm* — Buchanan Ingersoll & Rooney PC

(57) ABSTRACT

A wheel drive unit includes a planetary gear mechanism including a planetary gear and an internally-toothed gear. A casing is integrated with the internally-toothed gear, a wheel is attached to the casing, and the casing transmits rotation of the internally-toothed gear to the wheel. A bearing is fitted to an inner circumferential surface of the casing at a position more toward an interior of a vehicle than the planetary gear and rotatably supports the casing. An inner diameter of an outer race of the bearing is larger than an outer diameter of the planetary gear.

6 Claims, 3 Drawing Sheets

(prior art)

WHEEL DRIVE UNIT

Priority is claimed to Japanese Patent Application No. 2012-255524, filed Nov. 21, 2012, the entire content of which is incorporated herein by reference.

BACKGROUND OF THE INVENTION

1. Field of the Invention

The present invention relates to a wheel drive unit to drive wheels.

2. Description of the Related Art

Wheel drive units for driving wheels of a utility vehicle such as a forklift in which a reducer mechanism is built are known. Some wheel drive units having such a structure are configured such that a wheel hub to which a tire is attached is arranged outside the reducer mechanism. FIG. 1 is a cross sectional view of the wheel drive unit described in WO00/36317. A housing 9 of the wheel drive unit is fixed to a flange C by a bolt B. The flange C is fixed to a vehicle (not shown) by a bolt inserted through a bolt hole D. A planetary gear mechanism E embodying a reducer and a disk brake 6 are accommodated in the housing 9. A wheel (not shown) is tightened by bolts A to a hub 12 located farther away from the vehicle than the unit. The hub 12 is joined to the unit via a spline formed on the inner circumference of an output carrier 11 and is axially fixed by a bolt F.

SUMMARY OF THE INVENTION

The wheel drive unit according to one embodiment of the present invention comprises: a planetary gear mechanism including a planetary gear and an internally-toothed gear; a casing integrated with the internally-toothed gear, a wheel being attached to the casing, and the casing transmitting rotation of the internally-toothed gear to the wheel; a bearing fitted to an inner circumferential surface of the casing at a position more toward an interior of a vehicle than the planetary gear and rotatably supporting the casing, wherein an inner diameter of an outer race of the bearing is larger than an outer diameter of the planetary gear.

According to the embodiment, when the casing is removed from the wheel drive unit, the outer race of the bearing fitted to the inner circumferential surface of the casing more toward the vehicle than the planetary gear does not interfere with the tooth tip of the planetary gear, allowing the casing to be removed easily. Accordingly, the bearing provided more toward the vehicle than the planetary gear can be inspected and replaced easily without detaching the entirety of the wheel drive unit from the vehicle so that maintainability is improved.

The planetary gear mechanism may be of simple type or eccentric oscillation and meshing type. In the case of eccentric oscillation and meshing type, "a diameter of the planetary gear" means an outermost diameter (addendum circle) of the externally-toothed gear oscillating within a plane defined about a central axis normal to the plane. In the case of simple type, the phrase refers to an outer diameter of a circle connecting points located on two or more planet gears rotated around the sun gear that are farthest from the central axis of the sun gear (points located on the addendums of the planet gears that are farthest from the center of the sun gear).

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
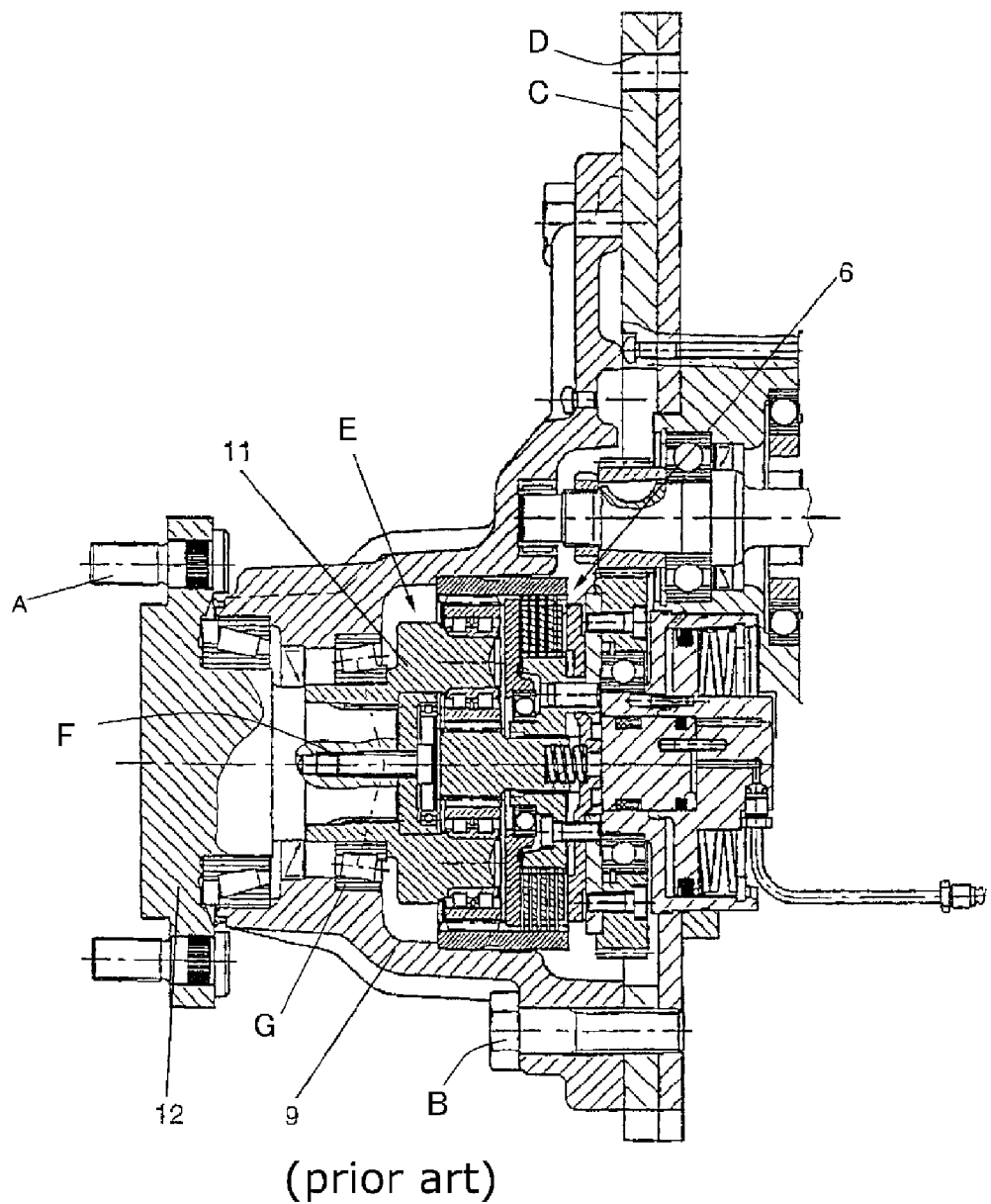
FIG. 1 is a cross sectional view of a wheel drive unit according to the related art.

In the related-art wheel drive unit described above, the hub 12 is fixed to the output carrier 11 by the bolt F. Therefore, even if the entirety of the wheel drive unit is removed from the vehicle, the bearing G rotatably supporting the output carrier 11 cannot be inspected and replaced unless the unit is broken up into components one by one, starting at the motor side in the right of FIG. 1 (not shown). For this reason, the related-art wheel drive unit has a problem with maintainability of components such as bearings in the unit.

Embodiments of the present invention address a need to provide a structure in which consumable parts in the unit can be inspected and replaced without removing the entirety of the wheel drive unit from the vehicle.

Figure 2A:
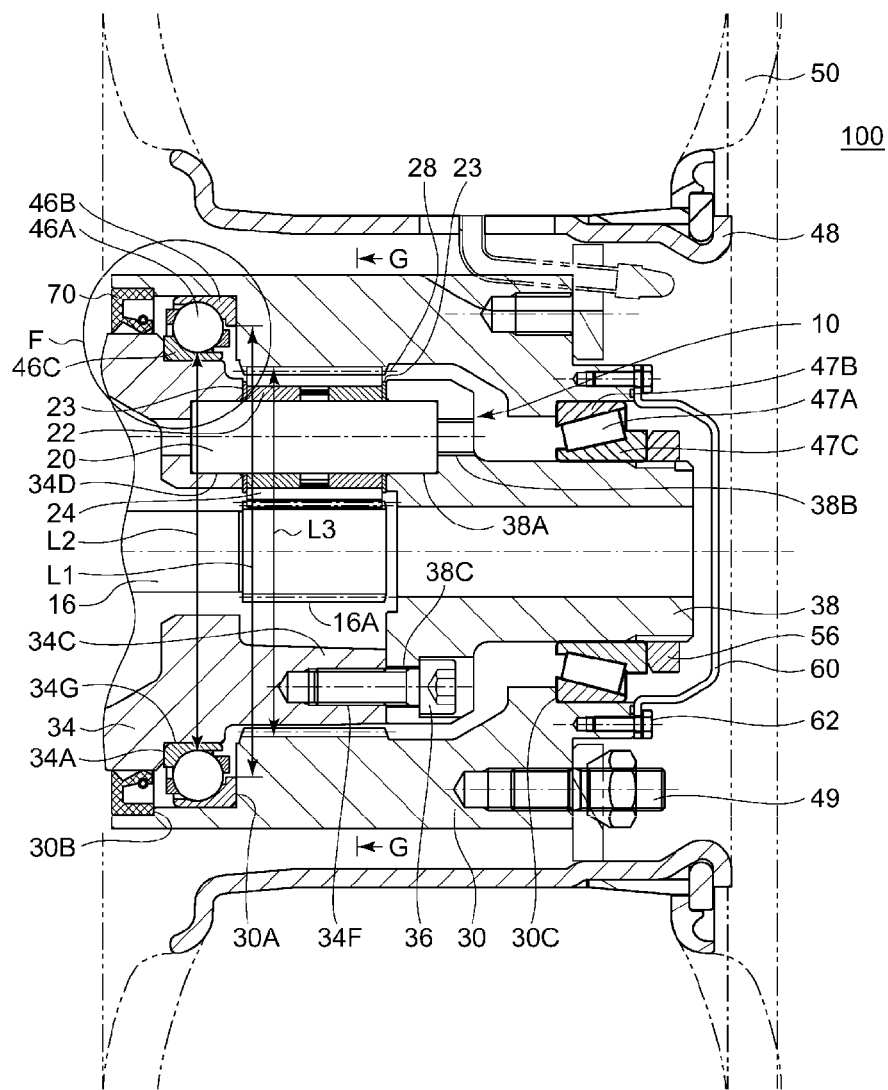
FIG. 2A is a cross sectional view that results when a wheel drive unit according to an embodiment of the present invention is severed by a vertical plane that includes the central axis.
Figure 2B:
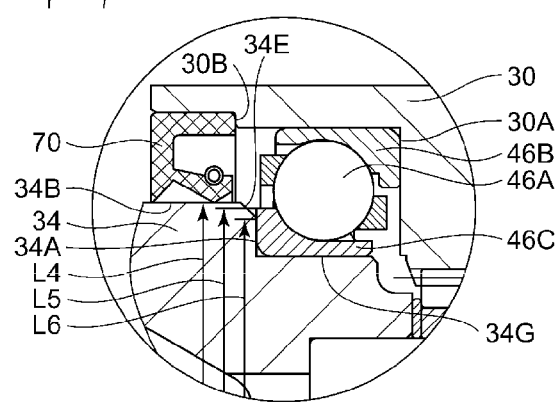
FIG. 2B is an enlarged view of a part of FIG. 2A indicated by F.
Figure 3:
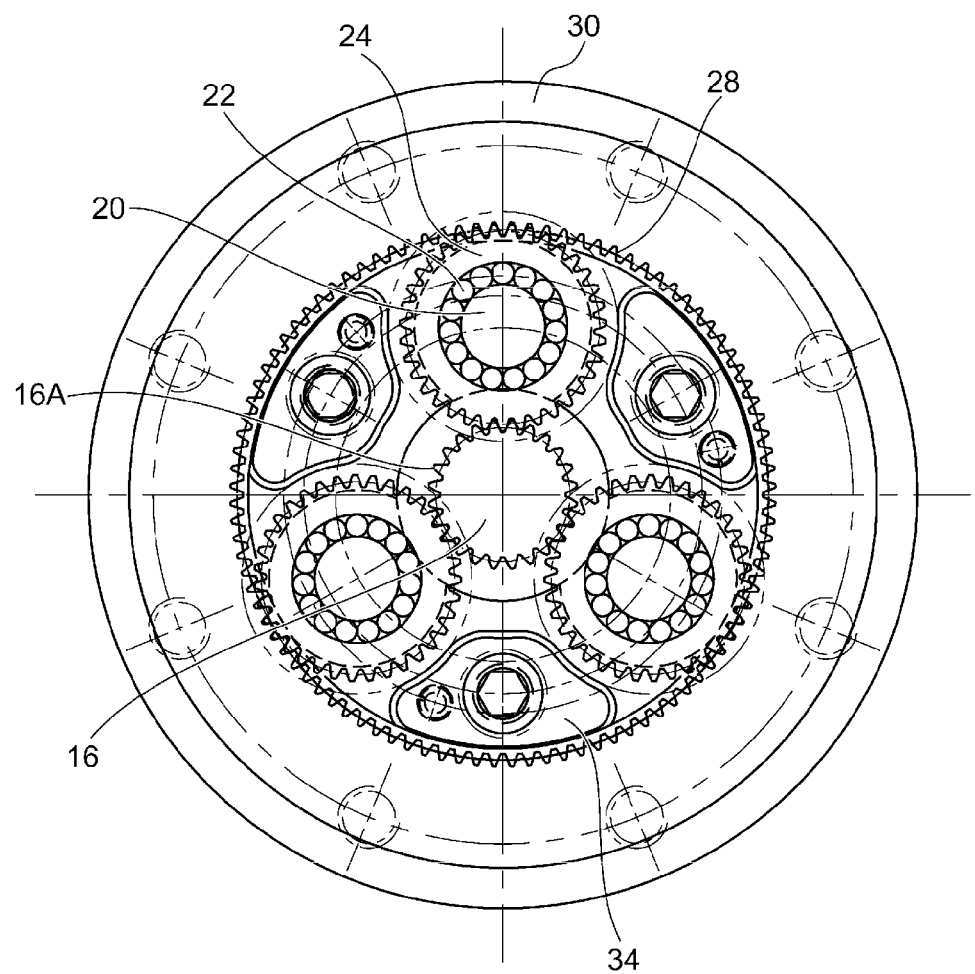
FIG. 3 is a G-G cross sectional view of FIG. 2A.

FIG. 2A is a cross sectional view that results when a wheel drive unit 100 according to an embodiment of the present invention is severed by a vertical plane that includes the central axis, and FIG. 2B is an enlarged view of a part of FIG. 2A indicated by F. FIG. 3 is a cross sectional view that results when the unit is severed by a plane including a line G-G of FIG. 2A and perpendicular to the central axis. The wheel drive unit 100 may be used in a utility vehicle such as a forklift.

The wheel drive unit 100 includes a reducer 10, which is a kind of planetary gear mechanism of simple planetary type, and a motor (not shown) joined to the reducer 10 in the left of FIG. 2A, i.e., toward the vehicle.

The output shaft of the motor also functions as an input shaft 16 of the reducer 10. An externally-toothed gear 16A that functions as a sun gear in the planetary gear mechanism is press-fitted to a part of the outer lateral surface of the input shaft 16. An additional reducer mechanism such as a parallel axis gear mechanism or a planetary gear mechanism may be provided to precede the reducer 10, depending on the required reduction ratio.

A plurality of (three, in the illustrated case) planetary gears 24 are arranged to externally mesh with the externally-toothed gear 16A. The planetary gears 24 internally mesh with an internally-toothed gear 28. The internally-toothed gear 28 is formed so as to be integrated with the inner circumferential surface of a casing 30. The internally-toothed gear 28 and the casing 30 may be formed as separate parts and joined afterwards so as to be integrated.

A first carrier body 34 fixed to a vehicle frame (not shown) is located at the axial end of the planetary gears 24 toward the vehicle (toward the interior of the vehicle). At the axial end of the planetary gears 24 away from the vehicle (toward the exterior of the vehicle) is located a second carrier body 38 integrated with the first carrier body 34 via carrier bolts 36 and carrier pins 20.

The ends of each of the carrier pins (planetary shafts) 20 is press-fitted into a recess 34D formed in the first carrier body 34 and a recess 38A formed in the second carrier body 38. The outer lateral surface of the intermediate part of each of the carrier pins 20 is contact with the corresponding one of the planetary gears 24 via a plurality of cylindrical skids 22. This allows the carrier pins 20 to support the planetary gears 24 so as to be rotatable around their own axes and prevents orbital motion of the planetary gears 24 around the central axis. Axial movement of the plurality of cylindrical skids 22 is prevented by plates 23 provided at both ends.

A column part 34C extending axially outward is formed in that part of the first carrier body 34 not supporting the planetary gears 24. A screw hole 34F is formed on the outer end face of the column part 34C in the axial direction. A counterbore 38C is formed in a part of the second carrier body 38 facing the column part 34C. By screwing the bolt 36 into the screw hole 34F via the counterbore 38C, the first and second carrier bodies 34 and 38 are tightened to each other.

A removal tap 38b running through the recess 38A from the end face facing the direction toward the exterior of the vehicle is provided in the second carrier body 38. By screwing a bolt into the removal tap 38B so as to thrust the end face of the carrier pin 20 toward the vehicle, the second carrier body 38 can be easily removed from the carrier pin 20 press-fitted into the recess 38A. A removal tap such as this may be provided in the neighborhood of the counterbore 38C of the second carrier body 38. In this case, the second carrier body 38 can be removed from the carrier pin 20 by thrusting the surface of contact between the column part 34C of the first carrier body 34 and the second carrier body 38 toward the vehicle by screwing a bolt into the removal tap.

The casing 30 of the reducer 10 is substantially cylindrically shaped. A first main bearing 46 is fitted in a recess 30A formed on the inner circumference of the casing 30 toward the interior of the vehicle. The casing 30 is rotatably supported on the outer circumference of the first carrier body 34 via the first main bearing 46. The casing 30 is provided with a reduced-diameter part toward the exterior of the vehicle. A second main bearing 47 is fitted in a recess 30C formed on the inner circumference of the reduced-diameter part. The casing 30 is rotatably supported on the outer circumference of the second carrier body 38 via the second main bearing 47. The first and second main bearings 46 and 47 may be press-fitted into the casing 30. Alternatively, the first and second main bearings 46 and 47 may be fitted in the casing 30, creating a gap, and then fixed to the casing 30 by a stopper ring (not shown).

A wheel 48 is joined via bolts 49 to the end face of the casing 30 away from the vehicle. A tire 50 of a forklift (not shown) is mounted to the wheel 48. The reducer 10 is accommodated within an axial range of the tire 50 (within the range denoted by dashed two dotted lines of FIG. 2).

A bearing nut 56 is screwed into a screw hole formed on the outer circumferential surface of the second carrier body 38. An inner race 47C of the second main bearing 47 is in contact with the left end face of the bearing nut 56, and an outer race 47B of the second main bearing 47 is in contact with the recess 30C of the casing 30. An outer race 46B of the first main bearing 46 is in contact with the recess 30A of the casing 30, and an inner race 46C of first main bearing 46 is in contact with an inner race stopper surface 34A formed in the first carrier body 34. As a result, axial movement of the casing 30 in which the first and second main bearings 46 and 47 are fitted is prevented by the bearing nut 56.

By modifying the amount by which the bearing nut 56 is pushed when the second carrier body 38, the casing 30, and the main bearings 46 and 47 are assembled, the preload given to the main bearings 46 and 47 can be controlled.

A cover 60 covering the bearing nut from outside is attached by bolts 62 to the end face of the casing 30 further away from the vehicle than the bearing nut 56.

The inner race 46C of the first main bearing 46 is fitted onto a bearing seat surface 34G formed on the outer circumferential surface of the first carrier body 34. Axial movement of the inner race 46C is prevented by the inner race stopper surface 34A toward the vehicle.

An oil seal 70 for sealing the gap between the inner circumference of the casing 30 and the outer circumferential surface (hereinafter, referred to as "oil seal seat surface") 34B of the first carrier body 34 is provided more toward the interior of the vehicle than the first main bearing 46. The oil seal 70 is fitted into a recess 30B formed on the inner circumference of the casing 30 such that a rip of the oil seal internally meshes with the oil seal seat surface 34B of the first carrier body 34. The bearing seat surface 34G is provided so as to have a smaller diameter than the oil seal seat surface 34B.

The oil seal seat surface 34B and the bearing seat surface 34G are joined by a joint surface. An axial gap may be provided between the joint surface and the lateral surface of the inner race 46C of the first main bearing 46 toward the vehicle. In one embodiment, the joint surface includes an inner race stopper surface 34A perpendicular to the oil seal seat surface 34B and configured to prevent axial movement of the inner race 46C toward the vehicle, and a sloping connecting surface 34E connecting the oil seal seat surface 34B and the inner race stopper surface 34A. Further, the outermost diameter L6 of the inner race stopper surface 34A (see FIG. 2B) is configured to be smaller than the outer diameter L5 of the inner race 46C. This creates a gap between the lateral surface of the inner race 46C toward the vehicle and the connecting surface 34E. By driving a pointed tool into the gap, the inner race 46C can be removed from the bearing seat surface 34G easily.

Instead of providing the sloping connecting surface 34E as described above, the inner race 46C may be fitted to the bearing seat surface 34G, sandwiching a spacer (not shown) having a smaller diameter than the outer diameter of the inner race 46C between the lateral surface of the inner race 46C of the first main bearing 46 toward the vehicle and the inner race stopper surface 34A. The spacer creates a gap between the lateral surface of the inner race 46C toward the vehicle and the inner race stopper surface 34A. By driving a pointed tool into the gap, the inner race 46C can be removed from the bearing seat surface 34G easily.

A description will now be given of the action of the wheel drive unit 100. The rotation of the output shaft of the motor (not shown) is transmitted to the input shaft 16 of the reducer 10 via a spline. When the input shaft 16 is rotated, the sun gear 16A is rotated and the planetary gears 24, orbital rotation of which is prevented by the carrier pins 20, are rotated around their own axes. The casing 30, which is integrated with the internally-toothed gear 28, is rotated at a rotational speed that is determined by differences in the number of teeth between the sun gear and the planetary gears and between the planetary gears and the internally-toothed gear and that is reduced from the rotation speed of the input shaft. The rotation of the casing 30 causes rotation of the tire 50 of the forklift via the wheel 48 fixed to the casing 30 by the bolts 49.

In the wheel drive unit 100 according to the embodiment, the inner diameter L1 of the outer race 46B of the first main bearing 46 is designed to be larger than the outer diameter (the outer diameter of a circle having a radius defined to be the maximum distance between the central axis of the sun gear 16A and the tooth tip of the planetary gears) L3 of the planetary gears 24. Thus, when the bearing nut 56 is removed to extract the casing 30 axially outward, the outer race 46B of the first main bearing 46 fitted to the inner circumferential surface of the casing 30 does not interfere with the tooth tip of the planetary gears 24, allowing the casing 30 to be removed from the remainder of the wheel drive unit easily.

A ball bearing in which rolling elements 46A are fitted in the race (rolling surface) of the outer race 46B may be used as the first main bearing. In such a ball bearing, axial movement of the rolling elements 46A with respect to the outer race 46B is prevented. In this case, it is preferable that the innermost diameter (the outer diameter of a circle having a radius defined to be the minimum distance between the central axis of the sun gear 16A and spherical surface of the rolling element) L2 of the rolling element 46A is designed to be larger than the outer diameter L3 of the planetary gears 24. This ensure that, when the bearing nut 56 is removed to extract the casing 30 axially outward, the rolling element 46A of the first main bearing 46 fitted to the inner circumferential surface of the casing 30 does not interfere with the tooth tip of the planetary gears 24, allowing the casing 30 to be removed from the remainder of the wheel drive unit easily. The first main bearing 46 may be a roller bearing instead of a ball bearing.

More preferably, the inner diameter L4 of the oil seal 70 is larger than the outer diameter L5 of the inner race 46C of the first main bearing 46. This ensure that, when the bearing nut 56 is removed to extract the casing 30 axially outward, the oil seal 70 fitted to the inner circumferential surface of the casing 30 does not interfere with the inner race 46C of the first main bearing 46 fixed to the first carrier body 34 and does not interfere with the tooth tip of the planetary gears 24, allowing the casing 30 to be removed from the remainder of the wheel drive unit easily.

By configuring the wheel drive unit as described above, consumable parts located toward the vehicle in the unit can be inspected or replaced according to the following procedures.

1. Remove the cover 60 and loosen and remove the bearing nut 56.

2. Pull the casing 30 axially outward. In this process, the entirety of the second main bearing 47, the outer race 46B of the first main bearing 46, and the oil seal 70, which are fixed to the casing 30, are moved along with the casing 30. The inner race 46C of the first main bearing 46 remains on the first carrier body 34.

3. Because the outer race 46B of the first main bearing 46 does not interfere with the tooth tip of the planetary gears 24 and the oil seal 70 does not interfere with the inner race 46C of the first main bearing 46 that remains on the first carrier body 34 and with the tooth tip of the planetary gears 24, the casing 30 can be removed from the remainder of the wheel drive unit easily.

4. The outer race 46B of the first main bearing 46 and the oil seal 70, which are fixed to the casing 30, are inspected and replaced. The inner race 46C of the first main bearing 46 is exposed outside as a result of removing the casing 30 and so can be inspected or replaced. As described above, due to a gap between the lateral surface of the inner race 46C toward the interior of the vehicle and the inner race stopper surface 34A, the inner race 46C can be removed from the bearing seat surface 34G of the first carrier body 34 easily by driving a pointed tool into the gap. Because the inner diameter of the inner race 46C is larger than the outer diameter L3 of the planetary gears 24 (see FIG. 2A), the inner race 46C can be removed alone without removing the planetary gears 24. If the inner diameter of the inner race 46C is smaller than the outer diameter L3 of the planetary gears, the following procedure 5 may be followed to isolate the second carrier body 38 from the first carrier body 34, remove the planetary gears 24, and then remove the inner race 46C.

5. To inspect or replace components of the planetary gear mechanism 10 (e.g., the planetary gears 24), the bolts 36 joining the first carrier body 34 and the second carrier body 38 are removed. Subsequently, the second carrier body 38 is isolated from the first carrier body 34 by driving a bolt into the removal tap 38B on the second carrier body 38 and thrust the end face of the carrier pin 20 toward the vehicle.

In this way, the planetary gears 24, etc. are exposed outside and can be inspected or replaced.

As described above, the wheel drive unit according to the embodiment provided with a casing to which a wheel is tightened is configured such that the casing can be removed from the remainder of the unit easily. Therefore, the bearing and the oil seal located more toward the interior of the vehicle than the planetary gear mechanism can be accessed without removing the entirety of the wheel drive unit from the vehicle. Accordingly, the job required for inspection or replacement of these components becomes easier and maintainability is improved.

Described above is an explanation based on an exemplary embodiment. The embodiment is intended to be illustrative only and it will be obvious to those skilled in the art that various modifications to constituting elements could be developed and that such modifications are also within the scope of the present invention.

The wheel drive unit including a planetary gear mechanism of simple planetary type is described by way of example. However, the reducer may not be of this type. For example, embodiments may be applied to wheel drive units provided with any type of planetary gear reducer (e.g., a planetary gear reducer of eccentric oscillation and meshing type in which the input shaft (eccentric body shaft) is located at the center of the internally-toothed gear, or a planetary gear reducer of eccentric oscillation and meshing type in which a plurality of eccentric body shafts are arranged at positions offset from the center of the internally-toothed gear).

The removal tap may be provided in wheel drive units that include a planetary gear reducer of eccentric oscillation and meshing type. In this case, the removal tap is provided to run through a hole into which the internal pin joining the first and second carrier bodies located at both ends of the externally-toothed gear is press-fitted.

A forklift is described by way of example of a utility vehicle driven by the wheel drive unit. However, the embodiments are applicable to any utility vehicle. For example, the embodiments are applicable to utility vehicles capable of carrying machinery for construction, civil engineering, or transportation or other types of vehicles.

What is claimed is:

1. A wheel drive unit for a vehicle, the wheel drive unit comprising:
   a planetary gear mechanism including a sun gear, an internally toothed gear, and two or more planetary gears that mesh with the internally-toothed gear;
   a casing integrated with the internally-toothed gear, a wheel being attached to the casing, and the casing transmitting rotation of the internally-toothed gear to the wheel;

a bearing fitted to an inner circumferential surface of the casing at a position more toward an interior of the vehicle than the planetary gears and rotatably supporting the casing;
wherein an inner diameter of an outer race of the bearing is larger than the diameter of a circle having a radius extending from a central axis of the sun gear to a point where the internally-toothed gear meshes with the planetary gears;
an oil seal fitted to the inner circumferential surface of the casing at a position more toward the interior of the vehicle than the bearing;
wherein an inner diameter of the oil seal is larger than an outer diameter of an inner race of the bearing;
a first carrier body located more toward the interior of the vehicle than the planetary gears and configured to support the planetary gears;
wherein the first carrier body includes an oil seal seat surface internally meshing with the oil seal, a bearing seat surface to which the inner race of the bearing is fitted and which has a smaller diameter than the oil seal seat surface, and a connecting surface configured to join the oil seal seat surface and the bearing seat surface; and
an axial gap is provided between the connecting surface and a lateral surface of the inner race toward the vehicle.

2. The wheel drive unit according to claim 1, wherein rolling elements of the bearing are axially fixed with respect to the outer race, and an innermost diameter of the rolling elements is larger than the diameter of the circle.

3. The wheel drive unit according to claim 1, wherein the connecting surface is adjacent an inner race stopper surface perpendicular to the oil seal seat surface and configured to prevent axial movement of the inner race of the bearing toward the vehicle, and the connecting surface connecting the oil seal seat surface and the inner race stopper surface, and
wherein an outer diameter of the inner race stopper surface is smaller than the outer diameter of the inner race of the bearing.

4. A wheel drive for a vehicle, the wheel drive unit comprising:
a planetary gear mechanism including a sun gear, an internally toothed gear, and two or more planetary gears that mesh with the internally-toothed gear;
a casing integrated with the internally-toothed gear, a wheel being attached to the casing, and the casing transmitting rotation of the internally-toothed gear to the wheel;
a bearing fitted to an inner circumferential surface of the casing at a position more toward an interior of the vehicle than the planetary gears and rotatably supporting the casing,
wherein an inner diameter of an outer race of the bearing is larger than the diameter of a circle having a radius extending from a central axis of the sun gear to a point where the internally-toothed gear meshes with the planetary gears,
wherein carrier bodies joined to each other are provided at respective axial ends of the planetary gears, and
wherein a removal tap for disjoining the carrier bodies is provided in one of the carrier bodies located away from the vehicle.

5. A wheel drive for a vehicle, the wheel drive unit comprising:
a planetary gear mechanism including a sun gear, an internally toothed gear, and two or more planetary gears that mesh with the internally-toothed gear;
a casing integrated with the internally-toothed gear, a wheel being attached to the casing, and the casing transmitting rotation of the internally-toothed gear to the wheel;
a bearing fitted to an inner circumferential surface of the casing at a position more toward an interior of the vehicle than the planetary gears and rotatably supporting the casing,
wherein an inner diameter of an outer race of the bearing is larger than the diameter of a circle having a radius extending from a central axis of the sun gear to a point where the internally-toothed gear meshes with the planetary gears, and
wherein when the casing is extracted toward an exterior of the vehicle, the outer race of the bearing is configured to detach from the inner race of the bearing and to move along with the casing toward the exterior of the vehicle.

6. The wheel drive unit according to claim 5, further comprising:
a second bearing that is fitted to the inner circumferential surface of the casing more toward the exterior of the vehicle than the planetary gears, the second bearing rotatably supporting the casing,
wherein when the casing is extracted toward the exterior of the vehicle, the entirety of the second bearing, including an inner race, an outer race and rolling elements, moves along with the casing toward the exterior of the vehicle.

* * * * *